US012761100B2

(12) United States Patent
Wang et al.

(10) Patent No.: US 12,761,100 B2
(45) Date of Patent: Oct. 13, 2026

(54) DEVICE FOR TESTING GAS TIGHTNESS OF BIPOLAR PLATE

(71) Applicant: VRB Energy Inc., Grand Cayman (KY)

(72) Inventors: Dehao Wang, Beijing (CN); Shuai Dong, Beijing (CN); Zhiwei Duan, Beijing (CN); Yongkai Han, Beijing (CN); Hedi Ma, Beijing (CN); Huichao Liu, Beijing (CN); Qiming Ge, Beijing (CN)

(73) Assignee: VRB Energy Inc. (KY)

(*) Notice: Subject to any disclaimer, the term of this patent is extended or adjusted under 35 U.S.C. 154(b) by 291 days.

(21) Appl. No.: 18/744,245

(22) Filed: Jun. 14, 2024

(65) Prior Publication Data

US 2025/0035504 A1 Jan. 30, 2025

(51) Int. Cl.
*G01M 3/06* (2006.01)
*H01M 8/0202* (2016.01)

(52) U.S. Cl.
CPC ............ *G01M 3/06* (2013.01); *H01M 8/0202* (2013.01)

(58) Field of Classification Search
CPC ....................................................... G01M 3/06
See application file for complete search history.

(56) References Cited

U.S. PATENT DOCUMENTS

2006/0269820 A1* 11/2006 Shen ..................... H01M 8/247 429/514
2008/0090123 A1* 4/2008 Peng ................... H01M 8/0258 429/457
2010/0279208 A1* 11/2010 Niezelski ............ H01M 8/0267 429/514
2017/0352894 A1* 12/2017 Kanno ................ H01M 8/0278
2022/0057287 A1 2/2022 Yoo et al.
2022/0255098 A1 8/2022 Tanaka
2022/0311031 A1 9/2022 Ebato et al.
(Continued)

FOREIGN PATENT DOCUMENTS

CN 205843899 U 12/2016
CN 108075156 A 5/2018
(Continued)

OTHER PUBLICATIONS

International Search Report and Written Opinion dated Sep. 14, 2024 for PCT/CN2024/099144.

*Primary Examiner* — Eric S. McCall
(74) *Attorney, Agent, or Firm* — Dorsey & Whitney LLP

(57) ABSTRACT

Disclosed in the present utility model is a device for testing gas tightness of a bipolar plate. The device includes a fixing assembly and a liquid placing plate. The fixing assembly includes a base plate and a cover plate. The base plate and the cover plate are arranged opposite to each other, and a test space capable of accommodating a bipolar plate is formed between the base plate and the cover plate. The base plate or the cover plate is provided with a gas inlet for gas to enter the test space. The liquid placing plate is arranged in the test space and arranged to be stacked on the plate surface of the bipolar plate facing away from the gas inlet. The liquid placing plate is provided with a plurality of liquid placing recesses capable of containing liquid. The liquid placing recesses pass through opposite plate surfaces of the liquid placing plate.

12 Claims, 3 Drawing Sheets

(56) References Cited

U.S. PATENT DOCUMENTS

| | | | | |
|---|---|---|---|---|
| 2024/0194954 | A1* | 6/2024 | Sasaki | H01M 10/4228 |
| 2024/0344914 | A1* | 10/2024 | Krahl | G01M 3/02 |
| 2025/0293271 | A1* | 9/2025 | Song | H01M 8/0284 |

FOREIGN PATENT DOCUMENTS

| | | | |
|---|---|---|---|
| CN | 111122062 | A | 5/2020 |
| CN | 111540933 | A | 8/2020 |
| CN | 215414230 | U | 1/2022 |
| CN | 216050518 | U | 3/2022 |
| CN | 220230839 | U | 12/2023 |
| KR | 20170130980 | A | 11/2017 |

* cited by examiner

DEVICE FOR TESTING GAS TIGHTNESS OF BIPOLAR PLATE

RELATED APPLICATIONS

This application claims priority to Chinese Patent Application No. 202321975717.9, filed Jul. 25, 2023, and titled DEVICE FOR TESTING GAS TIGHTNESS OF BIPOLAR PLATE, which is incorporated herein by reference in its entirety.

TECHNICAL FIELD

The present utility model relates to a bipolar plate testing technology, and more specifically, to a device for testing gas tightness of a bipolar plate.

BACKGROUND

A bipolar plate is an important component of a vanadium flow battery stack consisting of a plurality of single cells, and the structure of the single cell is composed of two pieces of carbon felt, a proton exchange membrane and a bipolar plate. The bipolar plate functions in the stack to connect the single cells in series so that the single cells are electrically interconnected and energized.

Since the working principle of the vanadium battery stack is to fix the plurality of single cells inside the stack housing by squeezing them, the compressive strength of the bipolar plate is an important test index before the assembly of the vanadium flow battery.

In addition, since a large amount of electrolyte flows in the stack of the vanadium flow battery, if the gas tightness of the bipolar plate is insufficient and there are leakage points on a plate surface, it will cause electrolyte leakage and cross-linking, resulting in battery damage and breakdown of the entire flow energy storage system.

At present, manufacturers of flow batteries that are common in the industry have factories themselves test the hardness of the bipolar plates before purchasing the bipolar plates. Since the installation method and process are different from one manufacturer to another, it is difficult to adapt the uniform pressure index of the bipolar plate supplier to various installation methods.

SUMMARY OF THE UTILITY MODEL

An embodiment of the present utility model provides a device for testing gas tightness of a bipolar plate, which can accurately determine the position of a gas bubble, thereby determining the gas leakage position of the bipolar plate.

The device for testing the gas tightness of the bipolar plate provided by the embodiment of the present utility model comprises:

a fixing assembly comprising a base plate and a cover plate, wherein the base plate and the cover plate are arranged opposite to each other, a test space capable of accommodating a bipolar plate is formed between the base plate and the cover plate, and the base plate or the cover plate is provided with a gas inlet for gas to enter the test space; and a liquid placing plate arranged in the test space and arranged to be stacked on a plate surface of the bipolar plate facing away from the gas inlet, wherein the liquid placing plate is provided with a plurality of liquid placing recesses capable of containing liquid, and the liquid placing recesses pass through opposite plate surfaces of the liquid placing plate.

In an exemplary embodiment, the plurality of liquid placing recesses are uniformly arranged on a plate surface of the liquid placing plate.

In an exemplary embodiment, the number of the liquid placing recesses is greater than or equal to 100.

In an exemplary embodiment, the cover plate comprises a plate body provided with a transparent observation portion, and the transparent observation portion is arranged opposite to the liquid placing plate.

In an exemplary embodiment, the base plate comprises a substrate and a first fixing frame protruding from a plate surface of the substrate facing the cover plate toward the cover plate, and the first fixing frame encloses a positioning recess capable of positioning the bipolar plate.

In an exemplary embodiment, the cover plate further comprises a second fixing frame protruding from a plate surface of the plate body facing the base plate toward the base plate, and the second fixing frame is sleeved on the outside of the first fixing frame, so that the cover plate and the base plate enclose a closed test space.

In an exemplary embodiment, the plate body is made of glass, the first fixing frame and the second fixing frame are both made of metal or plastic, and the plate body and the second fixing frame are assembled in a separable manner.

In an exemplary embodiment, the device for testing the gas tightness of the bipolar plate further comprises a pressing device arranged to press the fixing assembly;

wherein the pressing device comprises a bottom seat and a top seat that cooperates with and covers the bottom seat, the fixing assembly is sandwiched between the bottom seat and the top seat, the bottom seat abuts against the base plate, and the top seat abuts against the cover plate.

In an exemplary embodiment, the gas inlet is arranged in the base plate, the bottom seat is provided with a vent hole which is arranged corresponding to the gas inlet and communicates therewith, and the vent hole is arranged to be connected to a gas intake device.

In an exemplary embodiment, the top seat is provided with a hollowed-out portion, and the hollowed-out portion is provided with a pressing rib that abuts against the cover plate.

In an exemplary embodiment, the device for testing the gas tightness of the bipolar plate further comprises a support column for supporting the bottom seat, wherein the support column is detachably connected to the bottom seat.

In an exemplary embodiment, the bottom seat and the top seat are made of metal and are connected by a hinge; and/or the cover plate, the base plate, and the bottom seat are securely connected by fasteners.

In the device for testing the gas tightness of the bipolar plate according to the embodiment of the present utility model, the liquid placing plate is arranged on the plate surface of the bipolar plate facing away from the gas inlet, so that when the test is carried out, the position where the gas bubble occurs is observed through the plurality of liquid placing recesses on the liquid placing plate, so that the gas leakage position of the bipolar plate can be accurately determined. In addition, the arrangement of the liquid placing recesses can restrict liquid and prevent the gas bubble from disturbing the liquid flow due to excessive gas pressure, causing the gas bubble to deviate from the position where it occurs.

Other features and advantages of the present utility model will be set forth in the following description, and in part will become apparent from the description, or may be understood by means of the implementation of the present utility model. The objects and other advantages of the present utility model will be achieved and obtained by means of the structures particularly pointed out in the description and the accompanying drawings.

BRIEF DESCRIPTION OF THE DRAWINGS

The accompanying drawings are used to provide a further understanding of the technical solutions of the present utility model and constitute a part of the description, and together with the embodiments of the present utility model, are used to explain the technical solutions of the present utility model and not to limit the technical solutions of the present utility model.

DETAILED DESCRIPTION

In order to make the objects, technical solutions and advantages of the present utility model clearer, the embodiments of the present utility model will be described in detail below with reference to the accompanying drawings. It should be noted that, in the case of no conflict, the embodiments in the present application and the features in the embodiments may be arbitrarily combined with each other.

Figure 4:
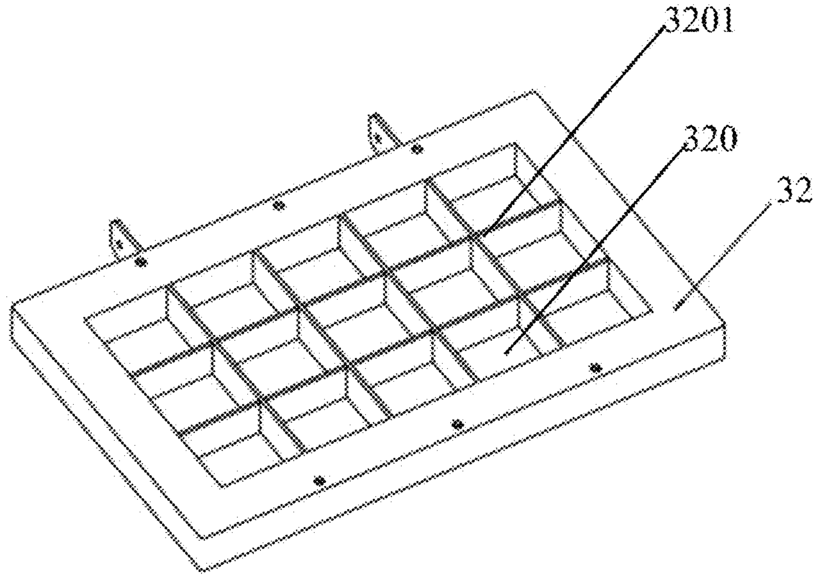
FIG. 4 is a perspective view of a top seat of the device for testing the gas tightness of the bipolar plate according to the present utility model.
Figure 5:
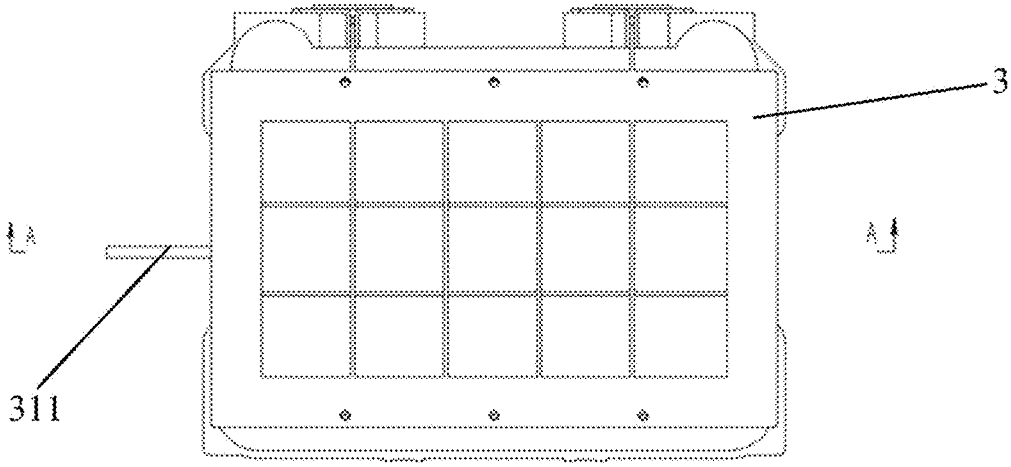
FIG. 5 is a top view of the device for testing the gas tightness of the bipolar plate according to the present utility model.
Figure 6:
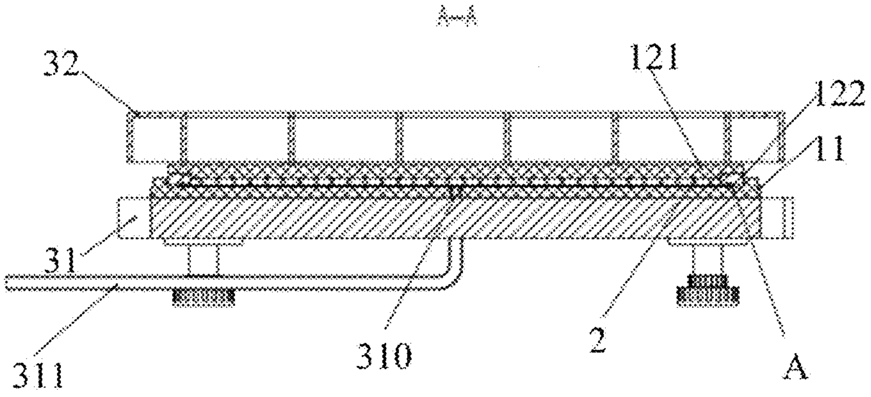
FIG. 6 is a sectional view of FIG. 5 in the direction of A-A.

As shown in FIGS. 1 to 6, an embodiment of the present utility model provides a device 100 for testing gas tightness of a bipolar plate, which is used to test the gas tightness of the bipolar plate A (see FIG. 6).

Figure 1:
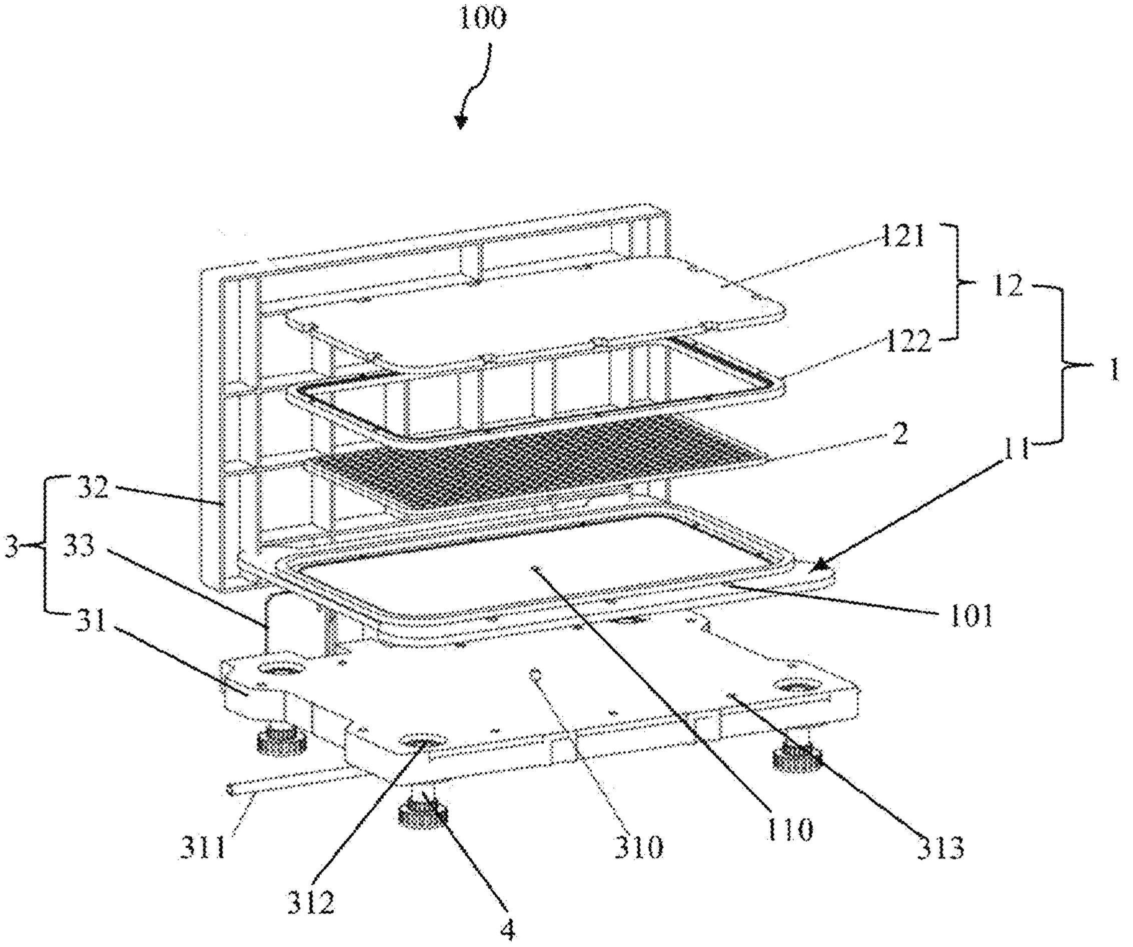
FIG. 1 is an exploded perspective view of a device for testing gas tightness of a bipolar plate according to the present utility model.

As shown in FIG. 1, the device 100 for testing the gas tightness of the bipolar plate according to the embodiment of the present utility model includes a fixing assembly 1 and a liquid placing plate 2. The fixing assembly 1 includes a base plate 11 and a cover plate 12. The base plate 11 and the cover plate 12 are arranged opposite to each other, and a test space capable of accommodating the bipolar plate A (see FIG. 6) is formed between the base plate 11 and the cover plate 12. The base plate 11 or the cover plate 12 is provided with a gas inlet 110 for gas to enter the test space.

Figure 2:
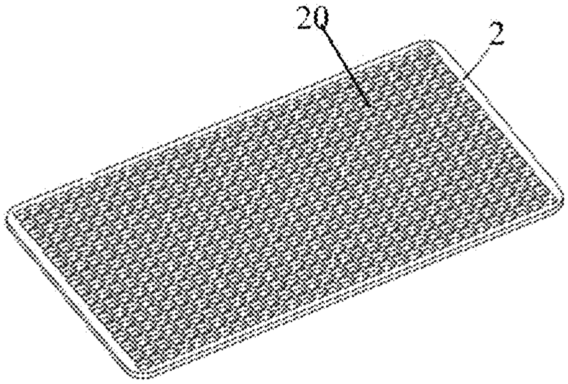
FIG. 2 is a perspective view of a liquid placing recess of the device for testing the gas tightness of the bipolar plate according to the present utility model.

As shown in FIGS. 1 and 2, the liquid placing plate 2 is arranged in the test space and arranged to be stacked on the plate surface of the bipolar plate A facing away from the gas inlet 110. A plate surface of the liquid placing plate 2 is provided with a plurality of liquid placing recesses 20 capable of containing liquid, and the liquid placing recesses 20 pass through opposite plate surfaces of the liquid placing plate 2. The plurality of liquid placing recesses 20 are uniformly arranged on the plate surface of the liquid placing plate 2.

In this embodiment, the plurality of liquid placing recesses 20 are uniformly arranged on the plate surface of the liquid placing plate 2 in an array. Generally, the number of liquid placing recesses 20 is greater than or equal to 100. In general, the more the number of liquid placing recesses 20, the higher the positioning accuracy. However, the amount of water to be contained will decrease, and it is not easy to see the gas bubbles clearly. Therefore, the amount of water to be contained should not be too much or too little, and can specifically be set according to actual conditions, which is not limited here.

Figure 3:
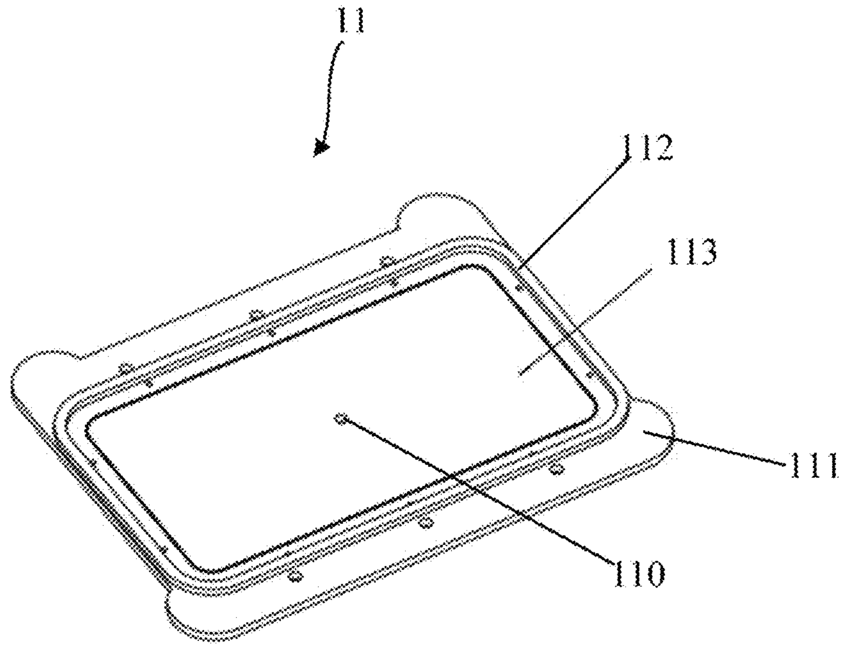
FIG. 3 is a perspective view of a base plate of the device for testing the gas tightness of the bipolar plate according to the present utility model.

As shown in FIG. 3, the base plate 11 includes a substrate 111 and a first fixing frame 112 protruding from a plate surface of the substrate 111 facing the cover plate 12 toward the cover plate 12. The first fixing frame 112 encloses a positioning recess 113 capable of positioning the bipolar plate A.

As shown in FIG. 1, the cover plate 12 includes a plate body 121, and the plate body 121 is provided with a transparent observation portion, and the transparent observation portion is arranged opposite to the liquid placing plate 2 so that a tester can observe the liquid placing plate 2. The cover plate 12 further includes a second fixing frame 122 protruding from the plate surface of the plate body 121 facing the base plate 11 toward the base plate 11.

In this embodiment, the plate body 121 is made of glass and serves as an observation portion as a whole. In other embodiments, the plate body 121 may be partially provided with an observation portion, which is not limited here.

In this embodiment, both the first fixing frame 112 and the second fixing frame 122 are made of metal. Of course, in other embodiments, the first fixing frame 112 and the second fixing frame 122 may be made of other materials such as plastic.

When the fixing assembly 1 of this embodiment is assembled, the second fixing frame 122 is sleeved on the outside of the first fixing frame 112, so that the cover plate 12 and the base plate 11 enclose a closed test space for testing the bipolar plate A.

In this embodiment, the plate body 121 and the second fixing frame 122 are connected and assembled in a separable manner. In other embodiments, the plate body 121 and the second fixing frame 122 may also be integrally molded, which is not limited here.

As shown in FIGS. 1 and 4 to 5, the device 100 for testing the gas tightness of the bipolar plate further includes a pressing device 3, and the pressing device 3 is arranged to press the fixing assembly 1.

The pressing device 3 includes a bottom seat 31 and a top seat 32 that cooperates with and covers the bottom seat 31. The fixing assembly 1 is sandwiched between a bottom seat 31 and a top seat 32. The bottom seat 31 abuts against the base plate 11, and the top seat 32 abuts against the cover plate 12. The bottom seat 31 and the top seat 32 are connected by using a hinge 33 to facilitate opening and closing of the bottom seat 31 and the top seat 32. In this embodiment, both the bottom seat 31 and the top seat 32 are made of metal. Of course, other materials such as plastic may also be used.

In this embodiment, the gas inlet 110 is arranged in the base plate 11, and the bottom seat 31 is provided with a vent hole 310 which is arranged corresponding to the gas inlet 110 and communicates therewith. The vent hole 310 is arranged to be connected to a gas intake device (not shown) through a vent pipe 311.

As shown in FIG. 4, the top seat 32 is provided with a hollowed-out portion 320, and the hollowed-out portion 320 is provided with a pressing rib 3201 that abuts against the cover plate 12 to provide a uniform pressing force.

As shown in FIG. 1, the device 100 for testing the gas tightness of the bipolar plate further includes a support column 4 for supporting the bottom seat 31, and the support column 4 is detachably connected to the bottom seat 31. The support column 4 is provided with a threaded end, and the bottom seat 31 is provided with a threaded hole 312 into which the threaded end is rotatably inserted.

As shown in FIG. 1, the cover plate 12, the base plate 11, and the bottom seat 31 are securely connected by fasteners (not shown), which may be screws, studs, or the like. The plate body 111 of the base plate 11, the second fixing frame 121 and the cover plate 12 are each provided with a plurality of through holes 101 for the fasteners to pass through. The bottom seat 31 is provided with locking holes 313 corresponding to the through holes 101 for the fasteners to be locked.

In an exemplary embodiment, the pressing device 3 includes a bottom seat (not shown) on which the fixing assembly 1 is placed, and a hydraulic rod (not shown) which reduces the pressure of the fixing assembly 1, and the like. For a detailed structure, reference may be made to the prior art, and it is not repeatedly described here.

As shown in FIGS. 1 and 5 to 6, when the device 100 for testing the gas tightness of the bipolar plate according to the embodiment of the present utility model tests the bipolar plate A, the bipolar plate A is first placed in the positioning recess 113 of the base plate 11, and then the liquid placing plate 2 is stacked on the plate surface of the bipolar plate A. Liquid is poured onto the liquid placing plate 2 so that each liquid placing recess 20 has the liquid. The liquid may be water or another kind of liquid. The cover plate 12 is assembled with the base plate 11, and the second fixing frame 122 is sleeved on the outside of the first fixing frame 112, so that the cover plate 12 and the base plate 11 enclose a closed test space. The bottom seat 31 and the top plate 32 are closed, and then the fixing assembly 1 and the pressing device 3 are securely locked by using a fastener. Finally, gas is input into the plate surface of the bipolar plate A facing the gas inlet hole 120 through the vent hole 310 and the gas inlet 120 for testing. During the test, the liquid placing plate 2 is observed. When a gas bubble appears in one or more of the liquid placing recesses 20 of the liquid placing plate 2, it is determined that the bipolar plate A has a gas leakage problem; otherwise, there is no gas leakage problem. If there is gas leakage, the gas leakage position of the bipolar plate A is determined according to the gas leakage position of the liquid placing recesses 20.

In the device 100 for testing the gas tightness of the bipolar plate according to the embodiment of the present utility model, a liquid placing plate 2 is arranged on the plate surface of the bipolar plate facing away from the gas inlet 120. When the test is carried out, the position where the gas bubble occurs is observed through the plurality of liquid placing recesses 20 on the liquid placing plate 2, so that the gas leakage position of the bipolar plate A can be accurately determined. In addition, the arrangement of the liquid placing recesses 20 can restrict liquid and prevent the gas bubble from disturbing the liquid flow due to excessive gas pressure, causing the gas bubble to deviate from the position where it occurs.

In the description of the present utility model, it should be noted that the orientation or position relationship indicated by the terms "upper," "lower," "one side," "the other side," "one end," "the other end," "edge," "relative," "four corners," "periphery," "凵 -shaped" structure or the like is based on the orientation or position relationship shown in the accompanying drawings, which is only for the convenience of describing the present utility model and simplifying the description, rather than indicating or implying that the structure referred to has a specific orientation, is constructed and operated in a specific orientation, and therefore cannot be understood as a limitation on the present utility model.

In the description of the embodiments of the present utility model, unless otherwise clearly specified and limited, the terms "connection," "direct connection," "indirect connection," "fixed connection," "installation" and "assembly" should be understood in a broad sense. For example, it may be a fixed connection, a detachable connection, or an integral connection. The terms "installation," "connection" and "fixed connection" may refer to a direct connection, an indirect connection through an intermediate medium, or internal communication between two elements. A person of ordinary skill in the art may understand the specific meanings of the above terms in the present utility model under specific circumstances.

Although the embodiments disclosed in the present utility model have been described above, the described content is merely embodiments adopted to facilitate the understanding of the present utility model and is not intended to limit the present utility model. Any person skilled in the field to which the present utility model pertains may make any modifications and variations in the form and details of implementation without departing from the spirit and scope disclosed in the present utility model, but the scope of patent protection of the present utility model should be defined by the appended claims.

The invention claimed is:

1. A device for testing gas tightness of a bipolar plate, characterized by comprising:

a fixing assembly comprising a base plate and a cover plate, wherein the base plate and the cover plate are arranged opposite to each other, a test space capable of accommodating a bipolar plate is formed between the base plate and the cover plate, and the base plate or the cover plate is provided with a gas inlet for gas to enter the test space; and a liquid placing plate arranged in the test space and arranged to be stacked on a plate surface of the bipolar plate facing away from the gas inlet, wherein the liquid placing plate is provided with a plurality of liquid placing recesses capable of containing liquid, and the liquid placing recesses pass through opposite plate surfaces of the liquid placing plate.

2. The device for testing the gas tightness of the bipolar plate according to claim 1, wherein the plurality of liquid placing recesses are uniformly arranged on a plate surface of the liquid placing plate.

3. The device for testing the gas tightness of the bipolar plate according to claim 1, wherein the number of the liquid placing recesses is greater than or equal to 100.

4. The device for testing the gas tightness of the bipolar plate according to claim 1, wherein the cover plate comprises a plate body provided with a transparent observation portion, and the transparent observation portion is arranged opposite to the liquid placing plate.

5. The device for testing the gas tightness of the bipolar plate according to claim 4, wherein the base plate comprises a substrate and a first fixing frame protruding from a plate surface of the substrate facing the cover plate toward the cover plate, and the first fixing frame encloses a positioning recess capable of positioning the bipolar plate.

6. The device for testing the gas tightness of the bipolar plate according to claim 5, wherein the cover plate further comprises a second fixing frame protruding from a plate surface of the plate body facing the base plate toward the base plate, and the second fixing frame is sleeved on the outside of the first fixing frame, so that the cover plate and the base plate enclose a closed test space.

7. The device for testing the gas tightness of the bipolar plate according to claim 6, wherein the plate body is made of glass, the first fixing frame and the second fixing frame are both made of metal or plastic, and the plate body and the second fixing frame are assembled in a separable manner.

8. The device for testing the gas tightness of the bipolar plate according to claim 1, further comprising a pressing device arranged to press the fixing assembly, wherein the pressing device comprises a bottom seat and a top seat that cooperates with and covers the bottom seat, the fixing assembly is sandwiched between the bottom seat and the top seat, the bottom seat abuts against the base plate, and the top seat abuts against the cover plate.

9. The device for testing the gas tightness of the bipolar plate according to claim 8, wherein the gas inlet is arranged in the base plate, the bottom seat is provided with a vent hole which is arranged corresponding to the gas inlet and communicates therewith, and the vent hole is arranged to be connected to a gas intake device.

10. The device for testing the gas tightness of the bipolar plate according to claim 8, wherein the top seat is provided with a hollowed-out portion, and the hollowed-out portion is provided with a pressing rib that abuts against the cover plate.

11. The device for testing the gas tightness of the bipolar plate according to claim 8, further comprising a support column for supporting the bottom seat, wherein the support column is detachably connected to the bottom seat.

12. The device for testing the gas tightness of the bipolar plate according to claim 8, wherein the bottom seat and the top seat are made of metal and are connected by using a hinge; and/or the cover plate, the base plate, and the bottom seat are securely connected by fasteners.

* * * * *